(12) United States Patent
Smith et al.

(10) Patent No.: US 9,375,818 B2
(45) Date of Patent: Jun. 28, 2016

(54) MANUFACTURING METHODS AND SYSTEMS USING SACRIFICIAL STRUCTURE PREFORMS

(71) Applicants: Kevin Scott Smith, Huntersville, NC (US); Robert G. Wilhelm, Charlotte, NC (US); Brian S. Dutterer, Charlotte, NC (US)

(72) Inventors: Kevin Scott Smith, Huntersville, NC (US); Robert G. Wilhelm, Charlotte, NC (US); Brian S. Dutterer, Charlotte, NC (US)

(73) Assignee: The University of North Carolina at Charlotte, Charlotte, NC (US)

( * ) Notice: Subject to any disclaimer, the term of this patent is extended or adjusted under 35 U.S.C. 154(b) by 225 days.

(21) Appl. No.: 13/916,923

(22) Filed: Jun. 13, 2013

(65) Prior Publication Data

US 2014/0000079 A1    Jan. 2, 2014

Related U.S. Application Data

(60) Provisional application No. 61/659,021, filed on Jun. 13, 2012.

(51) Int. Cl.
| | |
|---|---|
| *B23Q 17/12* | (2006.01) |
| *B23Q 17/20* | (2006.01) |
| *B23Q 7/12* | (2006.01) |
| *B23P 13/02* | (2006.01) |
| *B23C 3/00* | (2006.01) |

(52) U.S. Cl.
CPC . *B23Q 17/20* (2013.01); *B23C 3/00* (2013.01); *B23P 13/02* (2013.01); *B23Q 7/12* (2013.01); *B23C 2220/48* (2013.01); *B23P 2700/01* (2013.01); *Y10T 29/49771* (2015.01); *Y10T 29/49774* (2015.01); *Y10T 29/52* (2015.01); *Y10T 409/303752* (2015.01)

(58) Field of Classification Search
CPC .. B23Q 17/12; B23Q 17/20; Y10T 29/49771; Y10T 29/49774; Y10T 29/49776; Y10T 29/4932; Y10T 29/49758; Y10T 29/49764; Y10T 29/49995
See application file for complete search history.

(56) References Cited

U.S. PATENT DOCUMENTS

| | | | |
|---|---|---|---|
| 6,349,600 | B1 | 2/2002 | Davies et al. |
| 6,655,189 | B1 | 12/2003 | Smith |
| 6,976,810 | B2 | 12/2005 | Davies et al. |

(Continued)

OTHER PUBLICATIONS

Tlusty, J., et al, 1996, Techniques for the use of long slender end mills in high-speed milling, Annals of the CIRP, 45/1: 393-396.

(Continued)

*Primary Examiner* — Christopher Besler
(74) *Attorney, Agent, or Firm* — Clements Bernard PLLC; Christopher L. Bernard; Lawrence A. Baratta, Jr.

(57) ABSTRACT

A manufacturing method, including: given a predetermined finished part geometry, providing a sacrificial structure preform that simultaneously contains the finished part geometry, minimizes material that must be removed from the sacrificial structure preform to achieve the finished part geometry during machining, and has a sufficient stiffness to resist a machining force that will be applied during machining without allowing the finished part geometry to be compromised; and machining the sacrificial structure preform to achieve the finished part geometry. The manufacturing method also includes preliminarily estimating a stiffness of the finished part geometry and the machining force that will be applied during machining.

9 Claims, 7 Drawing Sheets

(56) References Cited

U.S. PATENT DOCUMENTS

| | | | |
|---|---|---|---|
| 7,177,713 | B2 | 2/2007 | Smith et al. |
| 7,280,950 | B2 * | 10/2007 | Heilenbach et al. ............... 703/7 |
| 7,427,179 | B2 | 9/2008 | Davies et al. |
| 7,770,278 | B2 | 8/2010 | Davies et al. |
| 7,787,696 | B2 | 8/2010 | Edgeworth et al. |
| 7,933,679 | B1 * | 4/2011 | Kulkarni et al. .............. 700/173 |
| 8,230,572 | B2 | 7/2012 | Davies et al. |
| 8,240,234 | B2 | 8/2012 | Woody et al. |
| 8,313,271 | B2 | 11/2012 | Smith |
| 8,401,691 | B2 | 3/2013 | Smith |
| 2009/0018689 | A1 | 1/2009 | Smith |
| 2009/0226272 | A1 | 9/2009 | Smith et al. |
| 2011/0016712 | A1 * | 1/2011 | Berlanger et al. ........... 29/889.7 |
| 2011/0118865 | A1 * | 5/2011 | Coffignal ........... G05B 19/4069 700/175 |

OTHER PUBLICATIONS

Smith, S., et al, 1998, The effect of tool length on stable metal removal rate in high speed milling, Annals of the CIRP, 47/1: 307-310.

Smith, S., Dvorak, D., 1998, Tool Path Strategies for High Speed Milling Aluminum Workpieces with Thin Webs, Mechatronics Journal, 8/3: 291-300.

Smith, S/ The Need Research and Development in Manufacturing and Metrology.

* cited by examiner

FIG. 7

MANUFACTURING METHODS AND SYSTEMS USING SACRIFICIAL STRUCTURE PREFORMS

CROSS REFERENCE TO RELATED APPLICATION

The present patent application/patent claims the benefit of priority of U.S. Provisional Patent Application No. 61/659,021, filed on Jun. 13, 2012, and entitled "SACRIFICIAL STRUCTURE PREFORMS," the contents of which are incorporated in full by reference herein.

FIELD OF THE DISCLOSURE

The present disclosure relates generally to manufacturing methods and systems. More specifically, the present disclosure relates to the use of sacrificial structure preforms in the machining of thin parts and the like from a variety of materials.

BACKGROUND OF THE DISCLOSURE

In many applications, such as aerospace applications and the like, it is desirable to manufacture thin metallic components. The machining of such thin metallic components as monolithic structures has largely replaced sheet metal assembly operations for aluminum components, for example. A stress-relieved plate stock workpiece is machined layer by layer using a relieved shank tool or the like. The workpiece is machined where it is stiff, and thin sections are left behind—the workpiece deriving its stiffness from the not-yet-machined sections.

However, such techniques have not really proven useful for difficult-to-machine and expensive materials, such as titanium and nickel alloys, for several reasons: (1) these materials are not amenable to use in stress-relieved plate stock; (2) these materials are far too expensive to necessitate all the excess that would be required; and (3) tool wear requirements with these materials demand small radial depths of cuts (restricting contact times and lowering maximum temperatures).

Thus, there have been numerous attempts to manufacture thin components made of difficult-to-machine and expensive materials utilizing near-net shape forming, near-net shape casting, and additive processes, without prior component and manufacturing process analysis. The structures made utilizing such techniques still need to be machined to reach final geometry, but they are so thin that they make stable, accurate machining difficult. As a result, some have resorted to innovative fixturing techniques to hold these thin workpieces during machining.

In other words, the machining of thin parts and the like is often difficult because such parts have insufficient static and dynamic stiffness. Accurate thin parts and the like are difficult to achieve due to the effects of clamping forces, cutting forces, residual stresses, and chatter. Thus, bulk structures have been used to support such parts during machining, but do not comprise constituents of the finished components, again, without prior component and manufacturing process analysis.

Conventional bulk and near-net shape structures simply do not work well in the machining of thin parts, as, in order to provide such parts with sufficient static and dynamic stiffness, too much material must be removed, resulting in unnecessary tool wear and the like. Thus, the conventional machining of thin parts from solid blocks (i.e. plate stock), for example, such as is done in the aerospace industry, is simply not adequate. It is desirable that machining, especially of difficult-to-machine and expensive materials, be insensitive to the thinness of the finished components.

BRIEF SUMMARY OF THE DISCLOSURE

In various exemplary embodiments, the present disclosure provides manufacturing methods and systems for the high-precision machining of thin parts from difficult-to-machine and expensive materials with high efficiency and low cost. Sacrificial structure preforms are used that have geometries that offer sufficient material stiffness during machining, minimize material usage, and reduce tool wear effects. In general, the sacrificial structure preforms: (1) have a geometry that completely contains the shape of the finished component while minimizing workpiece material consumption; (2) utilize sacrificial structure stiffeners that provide the sacrificial structure preform with a stiffness that is higher than that of the finished component; and (3) utilize sacrificial structure stiffeners that are configured and positioned to support expected machining forces, while minimizing tool wear associated with their eventual removal. These sacrificial structure preforms support a part during machining, but are not functional constituents of the finished component. They can take the form of buttresses, corrugations, ribs, flanges, and many other supporting geometries. Importantly, the total mass of the sacrificial structure preforms is substantially less than that of the plate stock or the thick near-net shapes typically required for stable machining.

In one exemplary embodiment, the present disclosure provides a manufacturing method, including: given a predetermined finished part geometry, estimating a stiffness of the finished part geometry and a machining force that will be applied during machining; selecting a sacrificial structure preform that simultaneously contains the finished part geometry, minimizes material that must be removed from the sacrificial structure preform to achieve the finished part geometry during machining, and has a sufficient stiffness to resist the machining force that will be applied during machining without allowing the finished part geometry to be compromised; and machining the sacrificial structure preform to achieve the finished part geometry. The sacrificial structure preform includes a plurality of sacrificial stiffening structures one of coupled to and integrally formed with the finished part geometry, and can be formed by casting, forging, welding, additive processes, etc. The plurality of sacrificial stiffening structures include a plurality of sacrificial stiffening structures selected from the group consisting of: buttresses, ribs, flanges, corrugations, steps, ridges, beads, and combinations of any thereof.

In another exemplary embodiment, the present disclosure provides a manufacturing system, including: given a predetermined finished part geometry, means for estimating a stiffness of the finished part geometry and a machining force that will be applied during machining; means for selecting a sacrificial structure preform that simultaneously contains the finished part geometry, minimizes material that must be removed from the sacrificial structure preform to achieve the finished part geometry during machining, and has a sufficient stiffness to resist the machining force that will be applied during machining without allowing the finished part geometry to be compromised; and a machine tool for machining the sacrificial structure preform to achieve the finished part geometry. The sacrificial structure preform includes a plurality of sacrificial stiffening structures one of coupled to and integrally formed with the finished part geometry, and can be formed by casting, forging, welding, additive processes, etc. The plurality of sacrificial stiffening structures include a plurality of sacrificial stiffening structures selected from the group consisting of: buttresses, ribs, flanges, corrugations, steps, ridges, beads, and combinations of any thereof.

In a further exemplary embodiment, the present disclosure provides a manufacturing method, including: given a predetermined finished part geometry, providing a sacrificial structure preform that simultaneously contains the finished part geometry, minimizes material that must be removed from the sacrificial structure preform to achieve the finished part geometry during machining, and has a sufficient stiffness to resist a machining force that will be applied during machining without allowing the finished part geometry to be compromised; and machining the sacrificial structure preform to achieve the finished part geometry. The manufacturing method also includes estimating a stiffness of the finished part geometry and the machining force that will be applied during machining. The sacrificial structure preform includes a plurality of sacrificial stiffening structures one of coupled to and integrally formed with the finished part geometry, and can be formed by casting, forging, welding, additive processes, etc. The plurality of sacrificial stiffening structures include a plurality of sacrificial stiffening structures selected from the group consisting of: buttresses, ribs, flanges, corrugations, steps, ridges, beads, and combinations of any thereof.

BRIEF DESCRIPTION OF THE DRAWINGS

The present disclosure is illustrated and described herein with reference to the various drawings, in which like reference numbers are used to denote like method steps/system components, as appropriate, and in which.

DETAILED DESCRIPTION OF THE DISCLOSURE

Again, in various exemplary embodiments, the present disclosure provides manufacturing methods and systems for the high-precision machining of thin parts from difficult-to-machine and expensive materials with high efficiency and low cost. Sacrificial structure preforms are used that have geometries that offer sufficient material stiffness during machining, minimize material usage, and reduce tool wear effects. In general, the sacrificial structure preforms: (1) have a geometry that completely contains the shape of the finished component while minimizing workpiece material consumption; (2) utilize sacrificial structure stiffeners that provide the sacrificial structure preform with a stiffness that is higher than that of the finished component; and (3) utilize sacrificial structure stiffeners that are configured and positioned to support expected machining forces, while minimizing tool wear associated with their eventual removal. These sacrificial structure preforms support a part during machining, but are not functional constituents of the finished component. They can take the form of buttresses, corrugations, ribs, flanges, and many other supporting geometries. Importantly, the total mass of the sacrificial structure preforms is substantially less than that of the plate stock or the thick near-net shapes typically required for stable machining.

Figure 1:
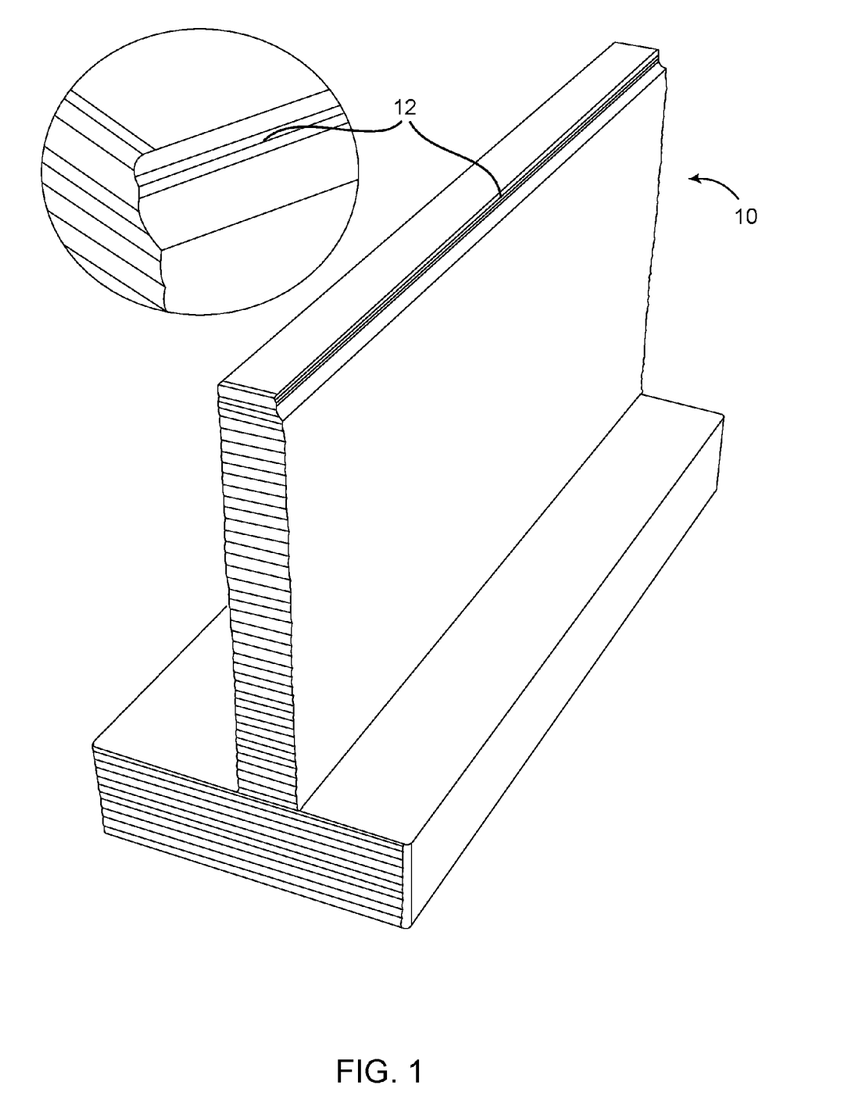
FIG. 1 is a perspective view of a near-net shape thin wall structure that has been partially machined—demonstrating the effects of chatter due to the insufficient static and dynamic stiffness associated with a near-net shape approach.

Referring to FIG. 1, by way of example, a 7050-T7 aluminum wall 10 that is 60 mm tall, 100 mm wide, and 7 mm thick is shown. This coupon represents a conventional near-net shape straight wall preform 10 for a finished wall 1 mm thick. Starting with the preform 10, machining is performed using a 12-mm diameter 2-flute solid carbide end mill at 17,000 rpm. The tool has a relieved shank, a 40-degree helix, and a 0.76-mm corner radius. In plate stock, this tool could make a 3 mm deep slot at this speed without chatter. The tool is used to make a small cut 12 at the top of the wall 10 3 mm deep, but only 1 mm wide, at 17,000 rpm. As the inset shows, the cut 12 is already unstable, due to insufficient stiffness of the preform 10.

One approach to prevent the chatter shown in FIG. 1 is to enhance the stiffness of the wall 10 by increasing its thickness, i.e. the thickness of the preform 10. This satisfies the second requirement discussed previously (utilize sacrificial structure stiffeners that provide the sacrificial structure preform with a stiffness that is higher than that of the finished component), but does not satisfy the first requirement (have a geometry that completely contains the shape of the finished component while minimizing workpiece material consumption) or the third requirement (utilize sacrificial structure stiffeners that are configured and positioned to support expected machining forces, while minimizing tool wear associated with their eventual removal). Thus, alternative preform geometries that meet all requirements are needed.

Figure 2:
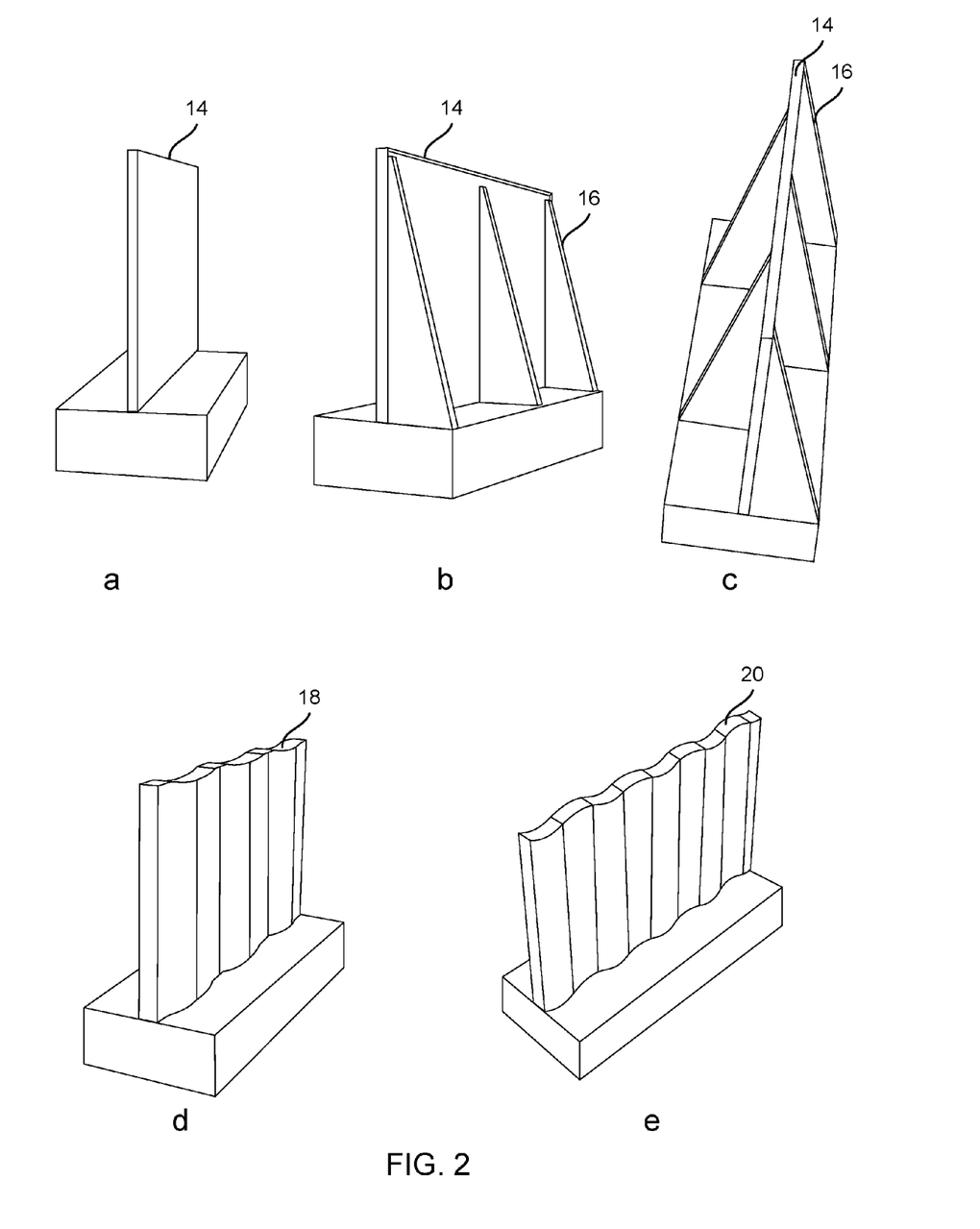
FIG. 2 is a series of perspective views (a-e) of thin wall sacrificial structure preforms in exemplary buttressed and corrugated geometries in accordance with the manufacturing methods and systems of the present disclosure.

Finite element analysis (FEA) is used to estimate the structural stiffness for each of a plurality of candidate coupons and to evaluate the ability of each to support anticipated machining forces. FIG. 2 illustrates: (a) a 2.6-mm thick straight wall preform 14; (b) a preform 14 of the same thickness with buttresses 16 on one side; (c) a preform 14 of the same thickness with buttresses 16 on both sides; (d) a sinusoidal corrugation preform 18 with a relatively long wavelength; and (e) a sinusoidal corrugation preform 20 with a relatively short wavelength. While other potential geometries will be readily apparent to those of ordinary skill in the art, this selection of geometries is illustrative. Each of the preforms 14, 18, and 20 contains the desired 1-mm thick finished wall, and increases the stiffness of the blank such that successful machining can be accomplished. As is demonstrated herein, for this example coupon, the preforms 14 with the buttresses 16 best satisfy the three process design attributes.

Figure 3:
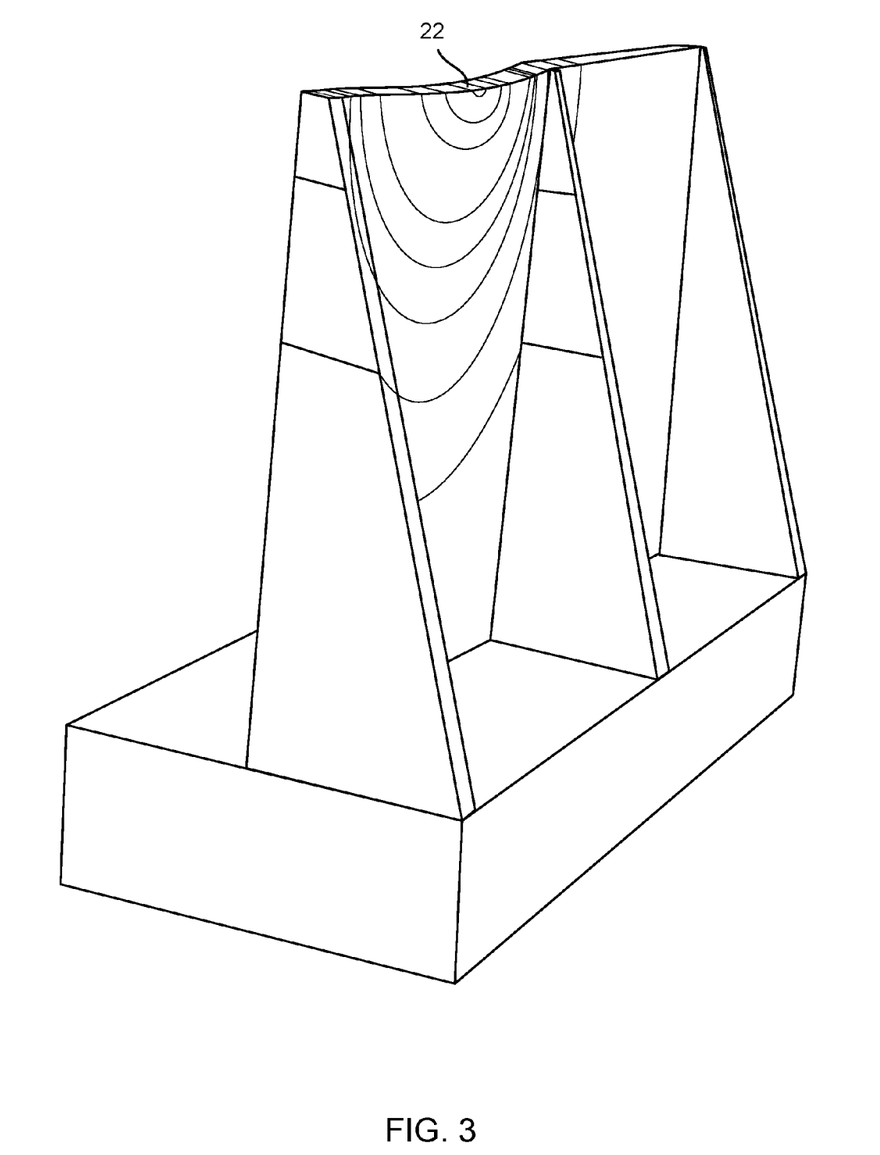
FIG. 3 is a representative view of a finite element calculation of deflection due to applied force at the top edge of one exemplary embodiment of thin wall sacrificial structure preforms in accordance with the manufacturing methods and systems of the present disclosure.

The stiffness of each of the coupons is calculated due to a point force applied at various points along the top edge, normal to the finished wall. The calculations are performed using the FEA software ABAQUS. Each of the coupon models is discretized using 8-node brick elements with reduced integration. In each case, the mesh used is sufficiently fine to ensure an accurate solution. The displacement at the point of application of the point force is obtained for each case using static, linear elastic analysis. The stiffness is calculated as the ratio of the applied point force and this displacement. An example displacement result 22 is illustrated in FIG. 3.

The applied point force is moved along the top of the finished wall to find the lowest stiffness for each case, and the results are provided in Table 1 below. The case lettering corresponds to that provided in FIG. 2, and the volume of the preform above the base is provided for each case.

TABLE 1

FEA Computed Minimum Stiffness of the Preforms of FIG. 2

| Case | Minimum Stiffness (N/m) | Volume (cm$^3$) |
| --- | --- | --- |
| a | $0.69 \times 10^5$ | 14.67 |
| b | $5.03 \times 10^5$ | 18.61 |
| c | $5.33 \times 10^5$ | 21.23 |
| d | $4.00 \times 10^5$ | 28.14 |
| e | $3.90 \times 10^5$ | 30.55 |

Machining tests on the coupons showed that the preforms 14 with buttresses 16 (cases b and c) provide ample stiffness for table machining at 17,000 rpm, 3-mm axial depth of cut, and 1-mm radial depth of cut, while cases a, d, and e do not. From this, it is inferred that the required minimum stiffness for stable machining at these conditions is between the $4.00 \times 10^5$ N/m of case d and the $5.03 \times 10^5$ N/m of case b.

Further calculation shows that the straight wall preform 14 of case a would have to be increased in thickness to 6.1 mm in order to provide the minimum stiffness required for stable machining, and the resulting volume would be 34.34 cm$^3$. Each of the example cases b-e generally reduces overall material in the preform as compared to this standard. Qualitatively, cases b and c, with a small number of very thin buttresses 16 to remove, reduced tool wear associated with the removal of sacrificial structures. The overall material volume of each case provides an even more compelling metric. The successful cases require between 18.6 cm$^3$ and 21.2 cm$^3$ of preform material, while the unsuccessful cases (cases d and e) require between 28.1 cm$^3$ and 30.6 cm$^3$ of preform material. Choosing a preform 14 with buttresses 16 on one side allows for machining of the finished geometry from a preform 14 with approximately 46% of the volume of the near-net shape straight wall preform 10 (FIG. 1).

Figure 4:
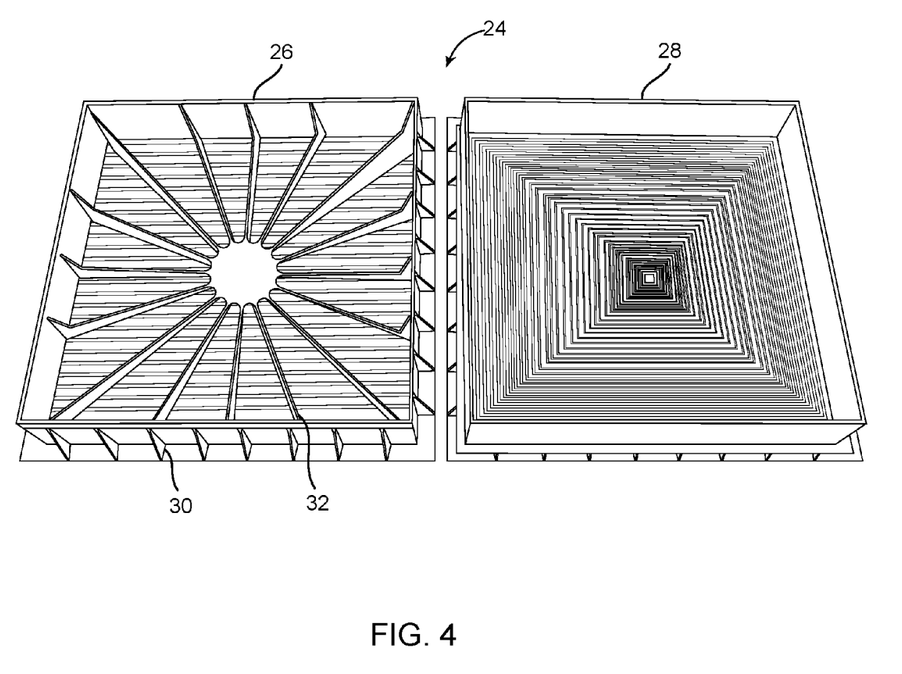
FIG. 4 is a series of perspective views (left and right) of one exemplary embodiment of thin pan sacrificial structure preforms in exemplary ribbed and buttressed, as well as final, geometries in accordance with the manufacturing methods and systems of the present disclosure.
Figure 5:
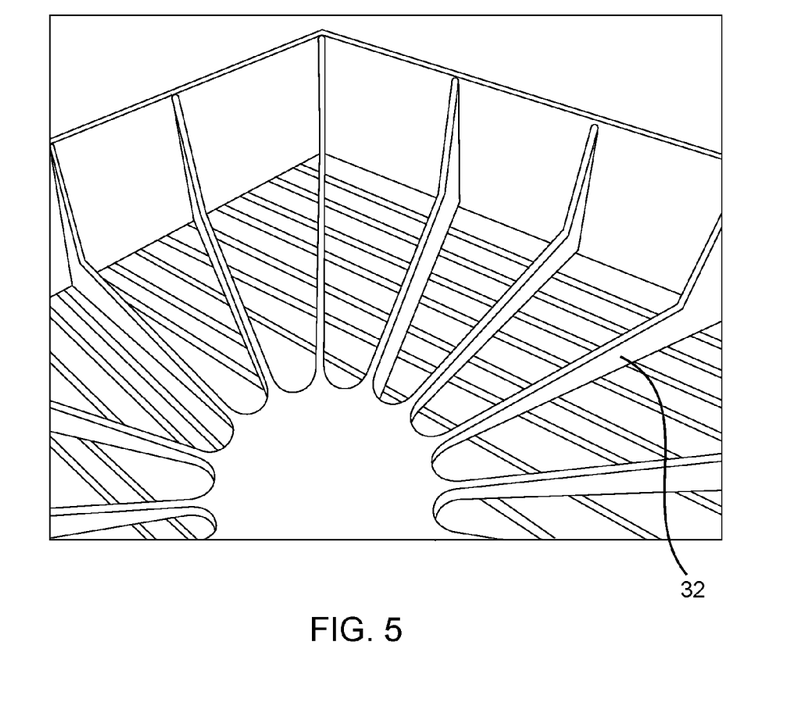
FIG. 5 is a partial perspective view of one exemplary embodiment of thin pan sacrificial structure preforms in exemplary ribbed and buttressed geometries in accordance with the manufacturing methods and systems of the present disclosure.
Figure 6:
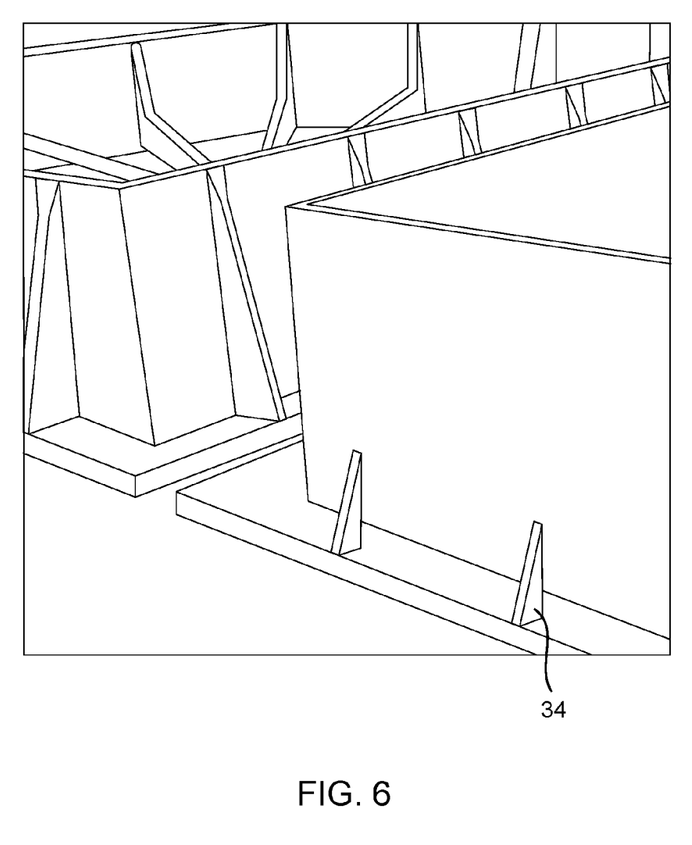
FIG. 6 is a partial perspective view of one exemplary embodiment of thin pan sacrificial structure preforms in exemplary buttressed geometries (in remnant form) in accordance with the manufacturing methods and systems of the present disclosure.

Applying the three attributes for preform geometries and using the results from FEA computations, preforms may be created for larger, more complex geometries, such as the pan 24 shown in FIG. 4. The preform 26 is one the left and the finished part 28 is on the right. In the finished part 28, the walls are 60 mm tall. The floor and walls are 1 mm thick, and the overall pan width is 480 mm. In the preform 26, the walls, buttresses 30, and ribs 32 are all 2.6 mm thick. The ribs 32 on the floor play the same role for the thin floor that the buttresses 30 on the walls play for the thin walls. The preform 26 is clamped to the table of the machine tool using toe clamps at the four corners of the preform 26. Although the preform 26 is made by milling in this exemplary embodiment, it can be made by any other process as well. It is apparent from the finished part 28 on the right that all of the machining is stable. The total machining time for the finished part 28 is less than 10 minutes. FIG. 5 shows a detail of the stiffening ribs 32. FIG. 6 shows a detail of non-functional remnants 34 of the buttresses 30 after machining.

Figure 7:
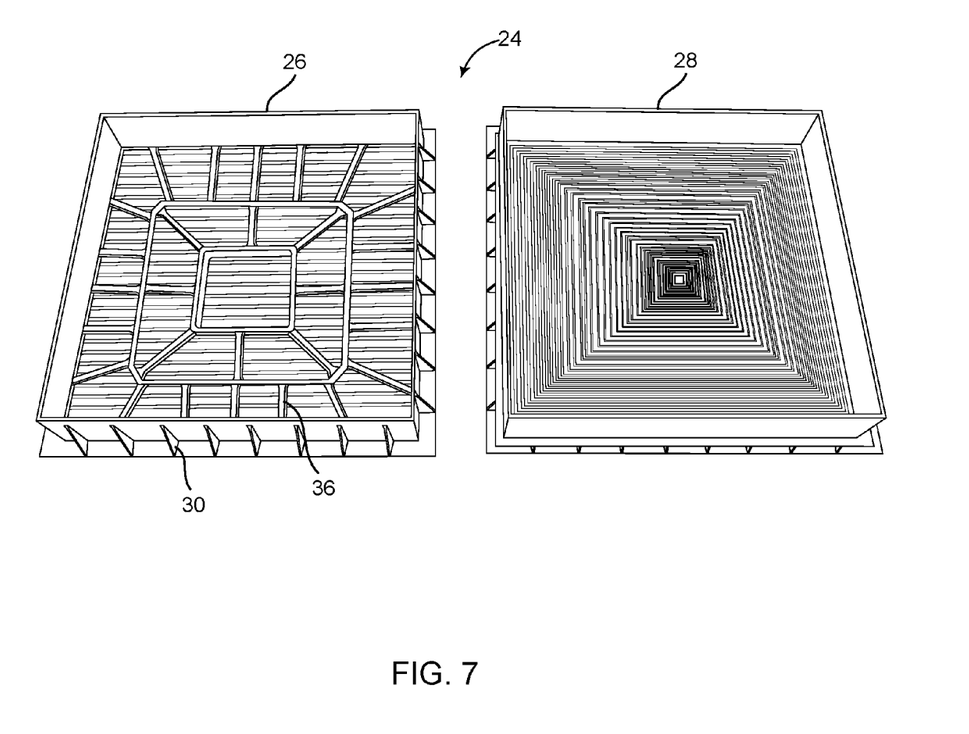
FIG. 7 is a series of perspective views (left and right) of another exemplary embodiment of thin pan sacrificial structure preforms in exemplary stiffened and buttressed, as well as final, geometries in accordance with the manufacturing methods and systems of the present disclosure.

FIG. 7 shows an alternate configuration of the stiffening ribs 36, and the resulting finished part 28. The large pan case demonstrates that the approach of the present disclosure can be successfully applied to any complex thin-walled part of considerable scale. Conventionally, large pans like this were fabricated from monolithic structures with over 90% of the material volume removed to achieve the finished part. The techniques of the present disclosure avoid almost all of this "waste" material, while providing the workpiece stiffness required to precisely machine thin-walled parts.

Sacrificial structure preforms allow stable, accurate machining of thin components in difficult materials, from preforms with minimal initial volumes. Preforms with sacrificial structure can be designed to reduce overall workpiece material consumption, while simultaneously providing sufficient stiffness for stable machining and minimizing tool wear. The general preform design procedure is as follows:

start with a finished part;
add minimum thickness/volume to allow for finish machining;
estimate the stiffness of the finished part; and
add sacrificial stiffeners to increase the minimum stiffness by an order of magnitude or more.

The examples provided herein demonstrate significantly reduced material volume in the preforms of the present disclosure, a machining strategy compatible with low tool wear in difficult materials, and efficient machining times. The techniques of the present disclosure form the basis for a more general approach, and they are broadly enabling for many types of manufacturing. It should be noted that the techniques of the present disclosure are especially applicable to both milling and lathing operations, without being so limited.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A manufacturing method, comprising:
providing a predetermined finished part geometry;
prior to machining a sacrificial structure preform to achieve the finished part geometry, estimating a stiffness of the finished part geometry and a machining force that will be applied while machining the sacrificial structure preform to achieve the finished part geometry;
prior to machining the sacrificial structure preform to achieve the finished part geometry, estimating a stiffness of a sacrificial structure preform, wherein the stiffness of the sacrificial structure preform exceeds the stiffness of the finished part geometry, and wherein the sacrificial structure preform simultaneously contains the finished part geometry and additional material, minimizes the additional material that must be removed from the sacrificial structure preform to achieve the finished part geometry, and has a sufficient stiffness to resist the machining force that will be applied without allowing the finished part geometry to be compromised;

modifying the additional material of the sacrificial structure preform based on the estimating the stiffness steps;

providing the sacrificial structure preform; and machining the sacrificial structure preform to achieve the finished part geometry by applying the machining force.

2. The manufacturing method of claim 1, wherein the estimating the stiffness steps each comprise estimating the stiffness using one or more of finite element modeling, closed form computation, and physical experimentation.

3. The manufacturing method of claim 1, wherein the estimating the machining force comprises estimating the machining force using one or more of cutting process modeling and physical experimentation.

4. The manufacturing method of claim 1, wherein the sacrificial structure preform comprises a plurality of sacrificial stiffening structures one of coupled to and integrally formed with the finished part geometry.

5. The manufacturing method of claim 4, wherein the plurality of sacrificial stiffening structures comprise a plurality of sacrificial stiffening structures selected from a group consisting of: buttresses, ribs, flanges, corrugations, steps, ridges, beads, and combinations of any thereof.

6. A manufacturing method, comprising:

providing a predetermined finished part geometry;

prior to machining a sacrificial structure preform to achieve the finished part geometry, using finite element analysis, estimating a stiffness of the finished part geometry and a machining force that will be applied while machining the sacrificial structure preform to achieve the finished part geometry;

prior to machining the sacrificial structure preform to achieve the finished part geometry, using finite element analysis, estimating a stiffness of a sacrificial structure preform, wherein the stiffness of the sacrificial structure preform exceeds the stiffness of the finished part geometry, and wherein the sacrificial structure preform simultaneously contains the finished part geometry and additional material, minimizes the additional material that must be removed from the sacrificial structure preform to achieve the finished part geometry, and has a sufficient stiffness to resist the machining force that will be applied without allowing the finished part geometry to be compromised;

modifying the additional material of the sacrificial structure preform based on the estimating the stiffness steps;

providing the sacrificial structure preform; and machining the sacrificial structure preform to achieve the finished part geometry by applying the machining force.

7. The manufacturing method of claim 6, wherein the estimating the machining force comprises estimating the machining force using one or more of cutting process modeling and physical experimentation.

8. The manufacturing method of claim 6, wherein the sacrificial structure preform comprises a plurality of sacrificial stiffening structures one of coupled to and integrally formed with the finished part geometry.

9. The manufacturing method of claim 8, wherein the plurality of sacrificial stiffening structures comprise a plurality of sacrificial stiffening structures selected from a group consisting of: buttresses, ribs, flanges, corrugations, steps, ridges, beads, and combinations of any thereof.

\* \* \* \* \*